Patented May 14, 1946

2,400,213

UNITED STATES PATENT OFFICE 2,400,213

CONCENTRATION OF ORES

Karl F. Schilling, Lakeland, Fla., assignor to Minerals Separation North American Corporation, New York, N. Y., a corporation of Maryland No Drawing. Application April 9, 1945, Serial No. 587,441

15 Claims. (Cl. 209—49)

This invention relates to the concentration of ores. Particularly, it relates to separating the components, with a view to recovering the valuable constituents, of a wide variety of non-sulfide ores and minerals. More particularly it relates to those in which non-sulfide non-silicate minerals are admixed with silicious gangue, or in which silicate minerals are admixed with quartz, or in which potash minerals occur in their soluble ores. Among such ores and minerals, to the beneficiation of which the invention is particularly adapted, are phosphate, iron ore, barite, calcite, feldspar, fluorspar, kyanite, industrial sands and the constituents of soluble ores such as sylvinite.

The invention resides in the discovery of a new type of collector which is a phosphorous compound belonging to the group of phosphorous acid amides and imides. Compounds of this type are referred to hereinafter as phosphorous amides and imides. Structurally they derive from phosphorous acid,

by substitution of one or more OH groups with one or more NH₂ or NH groups, the simplest being phosphorous acid mono-amide, and mono-imide,

Mono-amide      Mono-imide

All of the collectors of this invention are characterised, and chemically differentiated from collectors previously known to the art, by the fact that they contain the fundamental groups

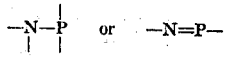

Included in this newly discovered class of collectors are the alkyl, alkylene, phenyl, cyclo-alkyl naphthyl, abietyl and urea substituted phosphorous amides and imides, their salts and halides.

However, to enable these compounds to function as collectors it is necessary that they contain at least one hydrocarbon group which is herein defined for convenience as a "functioning hydrocarbon group." This group may be: (a) an aliphatic group containing 7 or more carbon atoms at least 5 of which must be in a single straight chain; or (b) a hydrocarbon group such as is present in abietic acid; or (c) an alicyclic hydrocarbon such as is present in naphthenic acids; or (d) a naphthalene or substituted benzene group.

Examples of functioning hydrocarbon groups are octyl, lauryl, myristyl, stearyl, oleyl, 7-ethyl-2-methyl-undecane and abietyl groups and the naphthenyl groups having the empirical formulae $C_nH_{2n-2}O_2$ where $n$ is 8–13 and $C_nH_{2n-4}O_2$ and $C_nH_{2n-6}O_2$ where $n$ is 14–25.

The preferred collectors of the invention are those compounds which contain at least one of the above described fundamental groups and at least one functioning hydrocarbon group. The general structural formula for these compounds may be represented as

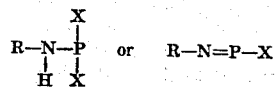

wherein R is a functioning hydrocarbon group; X is OR, NRH, OY, or a halogen; Y being a salt-forming group or element and at least one R in the molecule being a functioning hydrocarbon group.

These compounds are readily prepared by methods well known to those skilled in the art. For example, they may be prepared by condensing phosphorous acid or the substituted phosphorous acids or their amides with the proper amines or their hydrohalides, or by reacting phosphorus trichloride with amines or by reacting the ammonium salts of phosphorous acid with suitable organic halides. Certain compounds of the invention may be prepared by reacting a substituted phosphorous acid with urea. Ammonium, amine, metal and alkali metal salts of the compounds may be formed by well known procedures.

The collectors of this invention have cationic activity and function as collectors for quartz, other silicious materials and sylvite. This is surprising, as heretofore cationic collectors have been considered to be basic compounds or the salts thereof, yet many of the compounds of this invention are acids and form salts with basic substances. Nevertheless these compounds as well as their salts, function as cationic active agents.

Concentrating processes of known types in which the collectors of this invention are useful include froth flotation, agglomeration with separation by means of shaking tables, underwater screens, moving belts, pneumatic launders, revolving perforated cylinders, etc. Other reagents may be used in conjunction with the collectors, appropriate to the particular process used, such as frothers, conditioners and modifiers. Of particular benefit are the water-insoluble, non-frothing hydrocarbon oils such as fuel oil, kerosene, etc. Alkalies and acids or other pH adjusters may also be employed, their utility being readily ascertained by simple experimentation with the particular ore being treated, in a manner well known in the art. In concentrating soluble ores such as potash, the process should be carried out in a saturated aqueous solution of the soluble ore constituents.

The present invention may advantageously be utilized in step procedures, in one of the steps of which the collectors described are used. Thus, in the case of phosphate ores, the phosphate may be first partially concentrated by the use of the well known methods utilizing an alkali, fatty acids and a hydrocarbon oil; after which these reagents are inactivated or removed from the concentrate, for example by agitation with sulfuric acid, and then the residual quartz is removed by means of the collectors of the present invention. Or a portion of the quartz may be first removed by the agents of the present invention, followed by flotation of the phosphate with an alkali, fatty acids and a hydrocarbon oil. Purer products are obtainable by such combination methods.

Particular advantages of the collectors of this invention are the wide variety of ores to which they are applicable and the fact that in flotation they usually act immediately after being distributed in the pulp, at the most a short conditioning period being all that is required. Those compounds substantially insoluble in water may advantageously be dissolved in an organic solvent before being added to the pulp.

In such concentration processes as froth flotation, agglomeration tabling and the like, it is essential that there shall be selectively imparted to one of the ore constituents an air-adherent water-repellent quality. It is the functioning hydrocarbon group, as above defined, which gives to the reagents of this invention these essential qualities. It has been found by experiment that the functioning hydrocarbon group, whether it be aromatic, arylalkyl, alicyclic or aliphatic, may permissibly contain such constituents as halogens, low-molecular weight hydrocarbon groups, or ether, thioether, ester, imino and amido linkages, without impairing its capacity for imparting air-adherence and water-repellency.

The following specific examples are given by way of illustration of various embodiments of the invention and will illustrate to those skilled in the art how it is to be practiced. Examples 1-6 illustrate the effectiveness of various members of the class of compounds described on phosphate ore, in the concentration of which the collectors of the invention make it possible to float or agglomerate silicious gangue, showing these various members of the class to be qualitatively similar in their function. In Examples 7-12 a variety of ores and minerals were concentrated or purified, using typical phosphorous amides and imides of the invention, illustrating its general applicability to ores of the classes referred to above.

Example 1

Lauryl amine (commercial, redistilled) 18.5 g. and phosphorous acid, $H_3PO_3$, 50 ml., 30% solution (15 grams as $H_3PO_3$) were mixed. An opaque curd formed which was removed into another vessel. This curd was heated carefully to 180° C. to expel water. The reaction mixture was cooled and recrystallized. It came down as a white powder and melted at 69°–73° C.

The product, a mixture of lauryl phosphorous amide and lauryl phosphorous imide, was dissolved in dioxane (2.5%) and tested as a collector in the froth flotation concentration of phosphate ore, comprising from 33 to 37% bone phosphate of lime (B. P. L.) admixed with silicious gangue, which was made into an aqueous pulp of 70% solids, agitated and deslimed, and conditioned for 15 seconds at 70% solids with the above product in amount of 1 pound per ton of ore. Flotation was then effected, silica being removed in the froth. The machine discharge, comprising the phosphate concentrate, contained 63.8% B. P. L. with a recovery of 88.6%.

Example 2

The ore, and procedure were identical with Example 1, except that 2 pounds per ton of ore of the mixture of lauryl phosphorous amide and lauryl phosphorous imide was conditioned with 0.52 pound per ton of ore of $Ca(OH)_2$ for 15 seconds at 10% solids. Results were as follows:

| Product | Percent weight | Percent B. P. L. | Percent B. P. L. rec. |
| --- | --- | --- | --- |
| Feed | 100.0 | 37.5 | 100.0 |
| Machine discharge | 45.8 | 71.0 | 92.3 |
| Froth product | 54.2 | 5.4 | 7.7 |

Example 3

Octadecyl amine (C. P.) 26.7 g. (0.1 mol) and phosphorus trichloride, $PCl_3$, 68.7 g. (0.5 mol) were carefully mixed without cooling. When the addition of the $PCl_3$ was complete the mixture was heated to fumes for 15 minutes. The product was cooled and quenched in cold water to remove much of the unreacted $PCl_3$. A heavy white curd came down which upon removal was recrystallized once from isopropanol. This product, a mixture of N-octadecyl phosphorous amide chloride and N-octadecyl phosphorous imide chloride was dissolved in isopropanol (2.5%) and used as a quartz collector in the froth flotation concentration of phosphate ore. The ore and procedure were identical with Example 1, the reagent quantity being 5 pounds per ton of ore. Results were as follows:

| Product | Percent weight | Percent B. P. L. | Percent B. P. L. rec. |
| --- | --- | --- | --- |
| Feed | 100.0 | 37.6 | 100.0 |
| Machine discharge | 34.4 | 78.2 | 67.8 |
| Froth product | 65.6 | 19.5 | 32.2 |

Example 4

The ore, procedure and reagent were identical with Example 3, there being used only 4 pounds per ton of ore, of the reagent. Results were as follows:

| Product | Percent weight | Percent B. P. L. | Percent B. P. L. rec. |
| --- | --- | --- | --- |
| Feed | 100.0 | 38.1 | 100.0 |
| Machine discharge | 47.8 | 72.1 | 90.3 |
| Froth product | 52.2 | 7.1 | 9.7 |

Example 5

Tri-para-tertiary amyl phenylamino phosphine was prepared by carefully adding 13.7 g. (0.1 mol) of phosphorus trichloride to 55 g. (0.34 mol)

(excess) of p-tertiary-amyl aniline. This mixture was heated to a clear melt and held at this temperature (180-220° C.) for two minutes. Solution in ethanol when chilled yielded white to orange crystals. These were filtered off and made up into a 2.5% solution in methanol, and tested as a collector in the froth flotation concentration of phosphate ore, comprising from 34%-37% bone phosphate of lime (B. P. L.) admixed with silicious gangue, which was made into an aqueous pulp of 70% solids, agitated and deslimed, and conditioned for 15 seconds at 10% solids with 12 pounds per ton of feed of the tri-p-tertiary-amyl phenyl amino phosphine, adjusting the pH of the pulp by using 1.0 pound per ton of feed of H₂SO₄. Flotation was effected and the machine discharge contained 65.9% B. P. L. with a recovery of 94.6%.

*Example 6*

Tri-naphthenic amino phosphine, prepared by reacting naphthenic amines of average molecular weight of 220, 11 g. (.05 mol) with phosphorus trichloride 1.5 g. (.01 mol). After heating for 1 minute at 160-175° C., the product was dispersed (2.5%) in water and tested as a collector. The ore and procedure were identical to Example 1, the reagent, 3 pounds per ton of ore, being added to a pulp of 10% solids with 0.2 pound per ton of ore of pine oil. Flotation was effected and the machine discharge contained 65.6% B. P. L. with a recovery of 91.6%.

The following examples demonstrate the applicability of the compounds of this invention to the concentration of other ores than phosphate, to which the foregoing examples are directed.

*Example 7*

Sylvinite ore from Carlsbad, New Mexico, was crushed to pass a 10 mesh screen and was then deslimed and ground in saturated brine so that it would pass a 35 mesh screen, after which it was made into a pulp of about 20% solids with a saturated brine of ore constituents. The reagent, 1 pound per ton of ore, of a mixture of lauryl phosphorous amide and lauryl phosphorous imide prepared as described in Example 1, in a 2.5% aqueous solution, was added to this pulp, the pulp was then agitated for about 10 seconds to distribute the reagents and flotation was then effected. Results were as follows:

| Product | Per cent weight | Per cent KCl | Per cent KCl rec. |
|---|---|---|---|
| Feed | 100.0 | 37.1 | 100.0 |
| Machine discharge | 59.9 | 6.6 | 10.6 |
| Froth product | 40.1 | 82.8 | 89.4 |

This is, of course, a rough concentrate and grade could be raised by recleaning.

*Example 8*

The ore and procedure were identical with Example 7, the reagent used was 3 pounds per ton of ore of trinaphthenic amino phosphine in 2.5% water suspension prepared as described in Example 6. The froth product contained 75.2% KCl with a recovery of 79.0%.

*Example 9*

The test in Example 8 was repeated using 4 pounds per ton of ore of the reagent and with the addition of 1.0 pound per ton of ore of kerosene and 0.2 pound per ton of ore of pine oil. The froth product contained 78.3% KCl with a recovery of 74.7%. It will be noted that the addition of kerosene increased the grade by only 3.1% with a sacrifice in the recovery of 4.3%. Grade could be raised by recleaning.

*Example 10*

A sample of Minnesota iron ore, of a fineness to pass a 35 mesh screen and analyzing 27.8% Fe was made into a pulp of 20% solids and conditioned with 0.25 pound per ton of ore of a mixture of lauryl phosphorous amide and lauryl phosphorous imide (2.5% in water) made as described in Example 1. The machine discharge contained 46.8% Fe with a recovery of 84.0%.

*Example 11*

The ore and procedure were identical to Example 10. The reagent was 0.1 pound of tri-naphthenic amino phosphine (described in Example 6) in a 2.5% water suspension. The machine discharge yielded 39.7% Fe with a recovery of 91.0%.

*Example 12*

A sample of barite ore was agitated 3 minutes at 70% solids and deslimed, dried and screened to pass a 28 mesh screen. This was made into a pulp of 10% solids and 0.1 pound per ton of ore of a mixture of lauryl phosphorous amide and lauryl phosphorous imide in 2.5% water solution, prepared as in Example 1, added as collector. The machine discharge yielded 79.0% BaSO₄ with a recovery of 57.3%.

Summarizing some of the points illustrated by the foregoing examples, it will be observed that it has been shown that a wide range of compounds containing the fundamental phosphorous amide and imide groups and at least one functioning hydrocarbon group function as collectors. The examples include compounds in which the functioning hydrocarbon group or groups are aliphatic, alicyclic and aromatic; in which they are attached to nitrogen; and in which three such groups are attached to three different nitrogens. They also show that the compounds may have all of their OH groups replaced by a halogen.

The compounds of the examples and the particular procedures and ores therein set forth are to be taken as illustrative merely and not as limitations of the invention which is to be construed broadly within the purview of the claims.

What is claimed is:

1. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector selected from the group consisting of: phosphorous acid amides and imides and their salts which contain at least one functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; and subjecting the thus conditioned pulp to a concentration operation to separate the ore constituents.

2. The process of claim 1 wherein the said functioning hydrocarbon group is attached to the amido nitrogen atom of the phosphorous acid amide nucleus.

3. The process of claim 1 wherein the said functioning hydrocarbon group is attached to the amido nitrogen atom of the phosphorous acid imide nucleus.

4. The process of claim 1 wherein a mixture of phosphorous acid amides and phosphorous acid imides is used.

5. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector of the general formula

wherein R is a functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; X is OR, NRH, OY or a halogen, Y being a salt forming group or element; at least one R in the molecule being a functioning hydrocarbon group as above defined; and subjecting the thus conditioned pulp to a concentration operation to separate the ore constituents.

6. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector of the general formula

wherein R is a functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; X is OR, NRH, OY or a halogen, Y being a salt forming group or element; at least one R in the molecule being a functioning hydrocarbon group as above defined; and subjecting the thus conditioned pulp to a concentration operation to separate the ore constituents.

7. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector selected from the group consisting of phosphorous acid amides and imides and their salts which contain at least 7 carbon atoms at least 5 of which are in a single straight chain, and subjecting the thus conditioned pulp to a concentration operation to separate the ore constituents.

8. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with N-monolauryl phosphorous amide, and subjecting the thus conditioned pulp to a concentration operation to separate the ore constituents.

9. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with N-monolauryl phosphorous imide, and subjecting the thus conditioned pulp to a concentration operation to separate the ore constituents.

10. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector selected from the group consisting of phosphorous acid amides and imides and their salts containing at least one functioning hydrocarbon group which is an alicyclic group such as is present in the naphthenic acids, and subjecting the thus conditioned pulp to a concentration operation to separate the ore constituents.

11. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with naphthenyl phosphorous amide, and subjecting the thus conditioned pulp to a concentration operation to separate the ore constituents.

12. The process of claim 1 in which the concentration operation is a froth flotation treatment in a froth flotation machine.

13. The process of concentrating phosphate minerals from their ores containing silicious gangue which comprises admixing an aqueous pulp of the ore in a suitably divided state with N-monolauryl phosphorous amide and subjecting the thus conditioned pulp to a concentration operation to separate the ore constituents.

14. The process of concentrating phosphate minerals from their ores containing silicious gangue which comprises admixing an aqueous pulp of the ore in a suitably divided state with N-monolauryl phosphorous imide and subjecting the thus conditioned pulp to a concentration operation to separate the ore constituents.

15. The process of concentrating phosphate minerals from their ores containing silicious gangue which comprises admixing an aqueous pulp of the ore in a suitably divided state with naphthenyl phosphorous amide and subjecting the thus conditioned pulp to a concentration operation to separate the ore constituents.

KARL F. SCHILLING.